United States Patent
Fascenda et al.

(10) Patent No.: US 9,008,312 B2
(45) Date of Patent: *Apr. 14, 2015

(54) SYSTEM AND METHOD OF CREATING AND SENDING BROADCAST AND MULTICAST DATA

(71) Applicant: Koolspan, Inc., Bethesda, MD (US)

(72) Inventors: Anthony C. Fascenda, North Bethesda, MD (US); Emil Sturniolo, Medina, OH (US)

(73) Assignee: Koolspan, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,592

(22) Filed: Dec. 17, 2012

(65) Prior Publication Data

US 2013/0121491 A1     May 16, 2013

Related U.S. Application Data

(63) Continuation of application No. 13/047,384, filed on Mar. 14, 2011, now Pat. No. 8,345,875, which is a continuation of application No. 11/763,854, filed on Jun. 15, 2007, now Pat. No. 7,907,735.

(51) Int. Cl.
- *H04K 1/00* (2006.01)
- *H04L 29/06* (2006.01)
- *H04L 9/08* (2006.01)

(52) U.S. Cl.
CPC ............. *H04K 1/00* (2013.01); *H04L 63/0457* (2013.01); *H04L 63/065* (2013.01); *H04L 63/0853* (2013.01); *H04L 9/0822* (2013.01); *H04L 9/0869* (2013.01); *H04L 2463/061* (2013.01); *H04L 2209/601* (2013.01)

(58) Field of Classification Search
CPC ........ H04K 1/00; H04L 9/0869; H04L 9/0822
USPC ............................................................. 380/255
See application file for complete search history.

(56) References Cited

U.S. PATENT DOCUMENTS

| | | |
|---|---|---|
| 5,473,689 A | 12/1995 | Eberhard |
| 5,661,806 A | 8/1997 | Nevoux et al. |
| 5,768,382 A | 6/1998 | Schneier et al. |
| 6,026,165 A | 2/2000 | Marino et al. |
| 6,304,658 B1 | 10/2001 | Kocher et al. |
| 6,360,320 B1 | 3/2002 | Ishiguro et al. |
| 6,397,328 B1 | 5/2002 | Pitchenik et al. |

(Continued)

FOREIGN PATENT DOCUMENTS

WO     2006/136280     12/2006

OTHER PUBLICATIONS

International Search Report issued in PCT/US2007/014472 mailed Apr. 23, 2008.

(Continued)

*Primary Examiner* — Mohammad W Reza
(74) *Attorney, Agent, or Firm* — Hunton & Williams LLP

(57) ABSTRACT

A method of encrypting broadcast and multicast data communicated between two or more parties, each party having knowledge of a shared key, is provided. The key is calculated using values, some of which are communicated between the parties, so that the shared key is not itself transferred. Avoiding the transfer of the key offers several advantages over existing encryption methods.

14 Claims, 7 Drawing Sheets

(56) References Cited

U.S. PATENT DOCUMENTS

| | | | |
|---|---|---|---|
| 6,507,907 B1* | 1/2003 | Takahashi et al. | 713/150 |
| 6,526,264 B2 | 2/2003 | Sugar et al. | |
| 6,571,221 B1 | 5/2003 | Stewart et al. | |
| 6,591,364 B1 | 7/2003 | Patel | |
| 6,611,821 B2 | 8/2003 | Stahl et al. | |
| 6,625,591 B1 | 9/2003 | Vahalia et al. | |
| 6,643,781 B1 | 11/2003 | Merriam | |
| 6,766,453 B1 | 7/2004 | Nessett et al. | |
| 6,816,966 B1* | 11/2004 | Gupta et al. | 713/163 |
| 6,931,132 B2 | 8/2005 | Billhartz et al. | |
| 6,980,660 B1 | 12/2005 | Hind et al. | |
| 7,024,690 B1 | 4/2006 | Young et al. | |
| 7,028,186 B1 | 4/2006 | Stenman et al. | |
| 7,073,066 B1 | 7/2006 | Nessert | |
| 7,136,645 B2 | 11/2006 | Hanson et al. | |
| 7,174,564 B1 | 2/2007 | Weatherspoon et al. | |
| 7,248,833 B2 | 7/2007 | Lee | |
| 7,248,858 B2 | 7/2007 | Barber et al. | |
| 7,269,728 B1* | 9/2007 | Li | 713/163 |
| 7,277,547 B1 | 10/2007 | Delker et al. | |
| 7,283,525 B2 | 10/2007 | Burgess et al. | |
| 7,289,631 B2 | 10/2007 | Ishidoshiro | |
| 7,334,125 B1* | 2/2008 | Pellacuru | 713/163 |
| 7,424,605 B2 | 9/2008 | Arai | |
| 7,664,966 B2 | 2/2010 | Alkove et al. | |
| 8,307,204 B2* | 11/2012 | Niemi et al. | 713/163 |
| 2001/0023180 A1 | 9/2001 | Sauer | |
| 2001/0023446 A1 | 9/2001 | Balogh | |
| 2001/0048744 A1 | 12/2001 | Kimura | |
| 2001/0054147 A1 | 12/2001 | Richards | |
| 2002/0021665 A1 | 2/2002 | Bhagavath et al. | |
| 2002/0090089 A1 | 7/2002 | Branigan et al. | |
| 2002/0116338 A1 | 8/2002 | Gonthier et al. | |
| 2002/0129143 A1 | 9/2002 | McKinnon et al. | |
| 2002/0141385 A1 | 10/2002 | Wasik et al. | |
| 2002/0147819 A1 | 10/2002 | Miyakoshi et al. | |
| 2002/0157090 A1 | 10/2002 | Anton, Jr. | |
| 2002/0169712 A1 | 11/2002 | Ginzboorg et al. | |
| 2002/0174235 A1 | 11/2002 | Likourezos | |
| 2002/0174335 A1 | 11/2002 | Zhang et al. | |
| 2003/0041244 A1 | 2/2003 | Buttyan et al. | |
| 2003/0050041 A1 | 3/2003 | Wu | |
| 2003/0051132 A1 | 3/2003 | Kobayashi et al. | |
| 2003/0051140 A1 | 3/2003 | Buddhikot et al. | |
| 2003/0056096 A1 | 3/2003 | Albert et al. | |
| 2003/0061363 A1 | 3/2003 | Bahl et al. | |
| 2003/0061481 A1 | 3/2003 | Levine et al. | |
| 2003/0070067 A1 | 4/2003 | Saito | |
| 2003/0093680 A1 | 5/2003 | Astley et al. | |
| 2003/0095663 A1 | 5/2003 | Nelson et al. | |
| 2003/0097571 A1 | 5/2003 | Hamilton et al. | |
| 2003/0140256 A1 | 7/2003 | Hauenstein et al. | |
| 2003/0172144 A1 | 9/2003 | Henry et al. | |
| 2003/0172307 A1 | 9/2003 | Henry et al. | |
| 2003/0204443 A1 | 10/2003 | Knox | |
| 2003/0231772 A1 | 12/2003 | Chen et al. | |
| 2003/0235305 A1 | 12/2003 | Hsu | |
| 2004/0002923 A1 | 1/2004 | Ramaswamy et al. | |
| 2004/0003059 A1 | 1/2004 | Kitchin | |
| 2004/0017916 A1 | 1/2004 | Staddon et al. | |
| 2004/0023639 A1 | 2/2004 | Noel, Jr. | |
| 2004/0030889 A1 | 2/2004 | Chin et al. | |
| 2004/0078066 A1 | 4/2004 | Ohta et al. | |
| 2004/0100973 A1 | 5/2004 | Prasad | |
| 2004/0103282 A1 | 5/2004 | Meier et al. | |
| 2004/0103303 A1 | 5/2004 | Yamauchi et al. | |
| 2004/0107356 A1 | 6/2004 | Shamoon et al. | |
| 2004/0125781 A1 | 7/2004 | Walter et al. | |
| 2004/0148374 A1 | 7/2004 | Bush et al. | |
| 2004/0153553 A1 | 8/2004 | Chotkowski et al. | |
| 2004/0176024 A1 | 9/2004 | Hsu et al. | |
| 2004/0192264 A1 | 9/2004 | Liu et al. | |
| 2004/0196977 A1 | 10/2004 | Johnson et al. | |
| 2004/0198220 A1 | 10/2004 | Whelan et al. | |
| 2004/0203590 A1 | 10/2004 | Shteyn | |
| 2004/0203591 A1 | 10/2004 | Lee | |
| 2004/0208151 A1 | 10/2004 | Haverinen et al. | |
| 2004/0210762 A1 | 10/2004 | Kawamoto et al. | |
| 2004/0243808 A1 | 12/2004 | Ishiguro et al. | |
| 2004/0250077 A1 | 12/2004 | Jang et al. | |
| 2004/0264699 A1 | 12/2004 | Meandzija et al. | |
| 2005/0005148 A1 | 1/2005 | Ishibashi et al. | |
| 2005/0010680 A1 | 1/2005 | Zick et al. | |
| 2005/0015583 A1* | 1/2005 | Sarkkinen et al. | 713/150 |
| 2005/0074122 A1 | 4/2005 | Fascenda | |
| 2005/0076232 A1 | 4/2005 | Kawaguchi et al. | |
| 2005/0091483 A1 | 4/2005 | Fascenda | |
| 2005/0119967 A1 | 6/2005 | Ishiguro et al. | |
| 2005/0123141 A1 | 6/2005 | Suzuki et al. | |
| 2005/0152305 A1 | 7/2005 | Ji et al. | |
| 2005/0198529 A1 | 9/2005 | Kitani et al. | |
| 2005/0257074 A1 | 11/2005 | Alkove et al. | |
| 2006/0062393 A1 | 3/2006 | Hsu et al. | |
| 2006/0291660 A1 | 12/2006 | Gehrmann et al. | |

OTHER PUBLICATIONS

International Search Report issued in PCT/US2003/031930 mailed Dec. 6, 2004.
Bruce Potter, "Wireless Security's Future," On the Horizon, IEEE 2003, pp. 68-72.
John Cox, "Vendors Offer Tools to Control, Secure WLANs," Network World, Jun. 7, 2004; 21, 23; ABI/INFORM Global, p. 24.
Miguel Bravo-Escos, "Networking Gets Personal," IEEE Review, Jan. 2002, pp. 32-36.
"Robust Header Compression (rohc)", retrieved from the internet on Jul. 18, 2007, retrieved from the internet at http://www.ietff.org/html/rohc-charter.html, 5 pages.
V. Jacobson, "Compressing TCP/IP Headers for Low-Speed Serial Links", Network Working Group, retrieved from the internet on Jul. 18, 2007, retrieved from the internet at http://tools.ietf.org/rfc/rfc1144.txt, 48 pages.
D. Durham, et al., "The COPS (Common Open Policy Service) Protocol", Network Working Group, retrieved from the internet on Jul. 18, 2007, retrieved from the internet at http://www.rfc-editor.org/rfc/rfc2748.txt, 36 pages.
Canadian Office Action dated Feb. 12, 2014.
European Search Report dated Aug. 14, 2014 for Application No. 07835848.8.

* cited by examiner

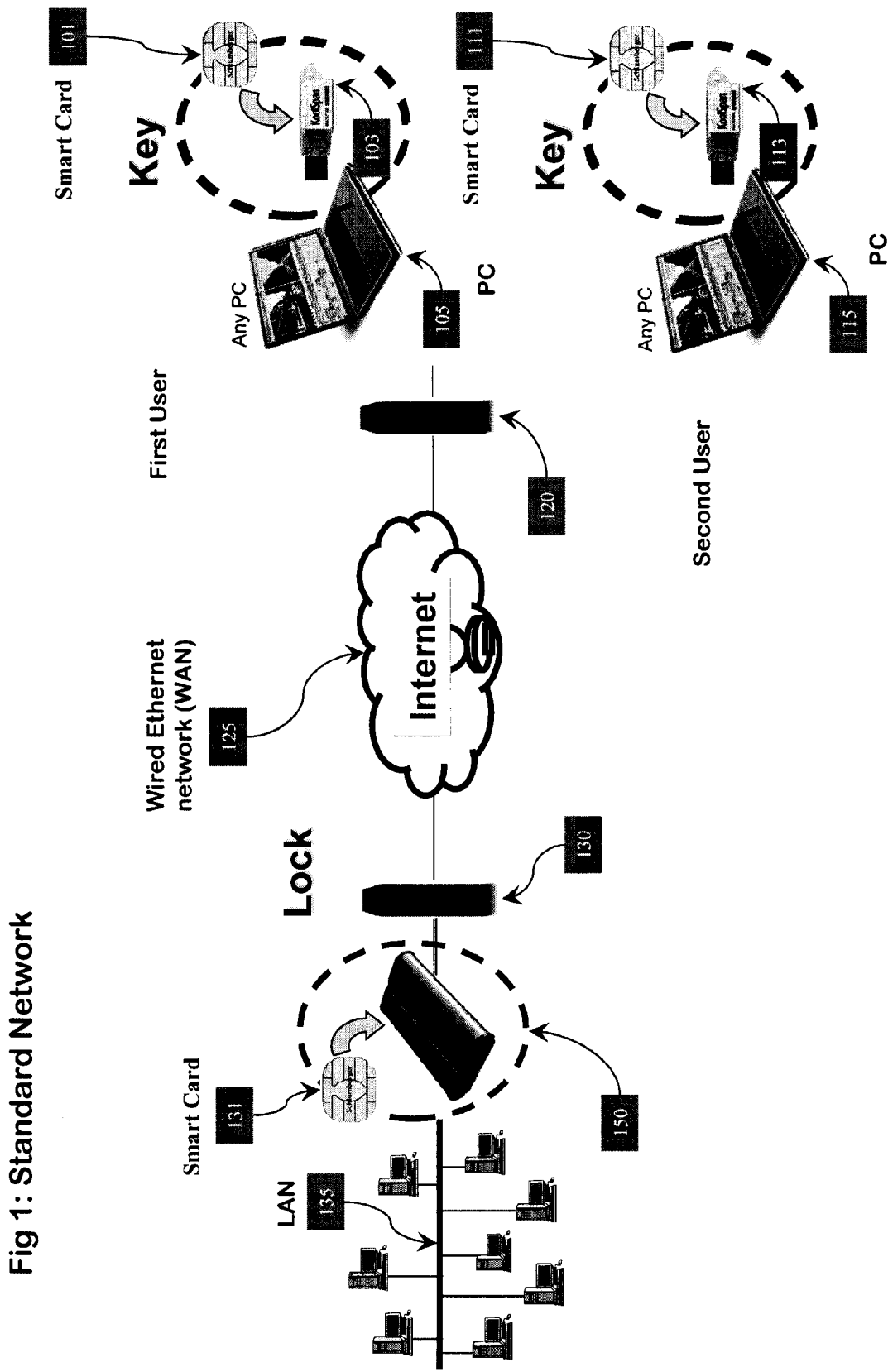
Fig 1: Standard Network

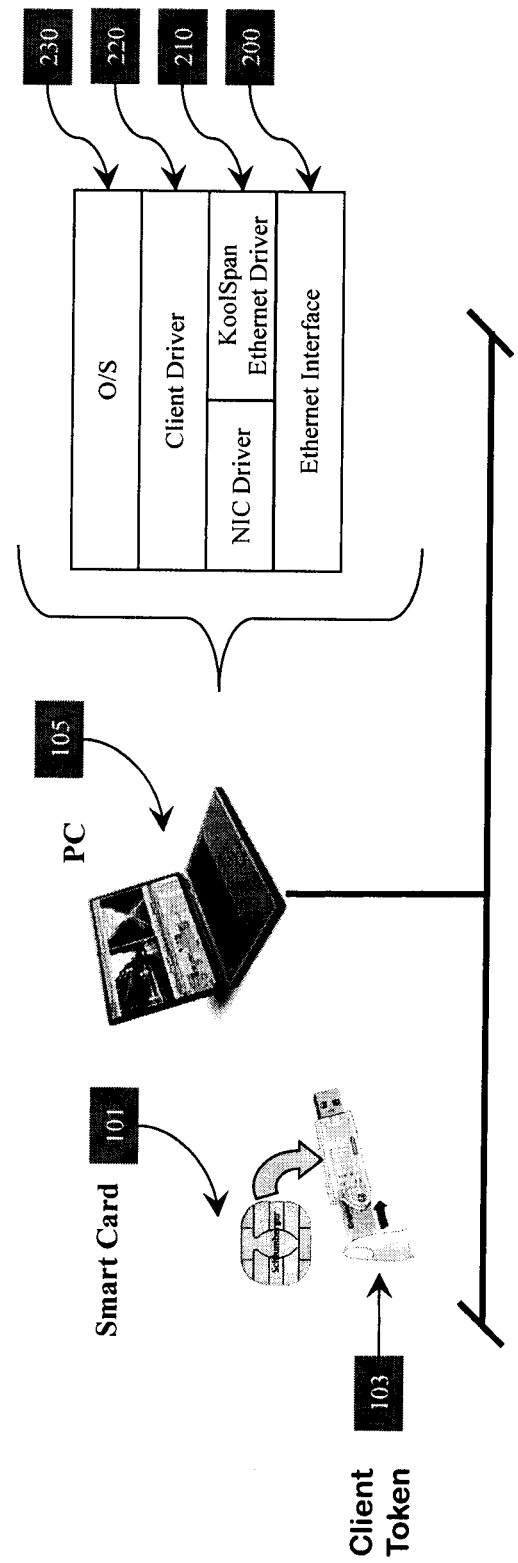
Fig 2: Smart-Card Enabled Components - Client

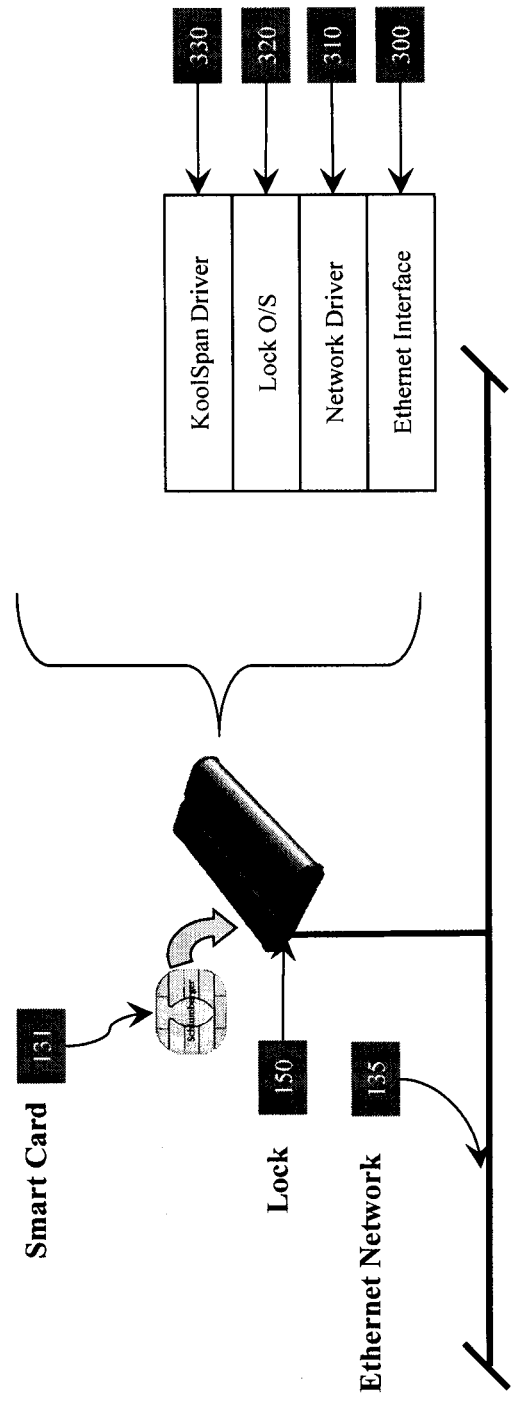
Fig 3: Smart-Card Enabled Network Component - Lock

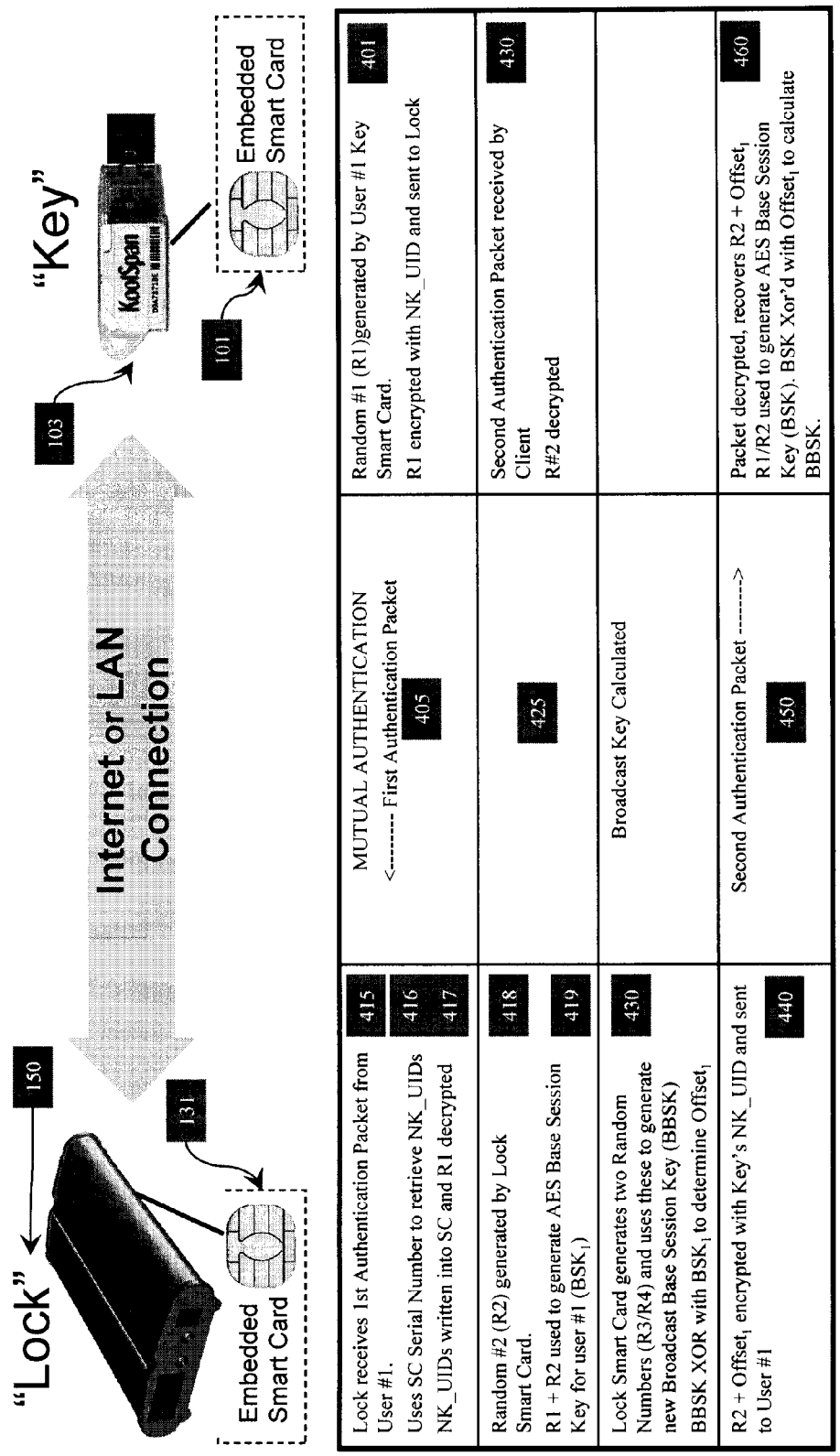

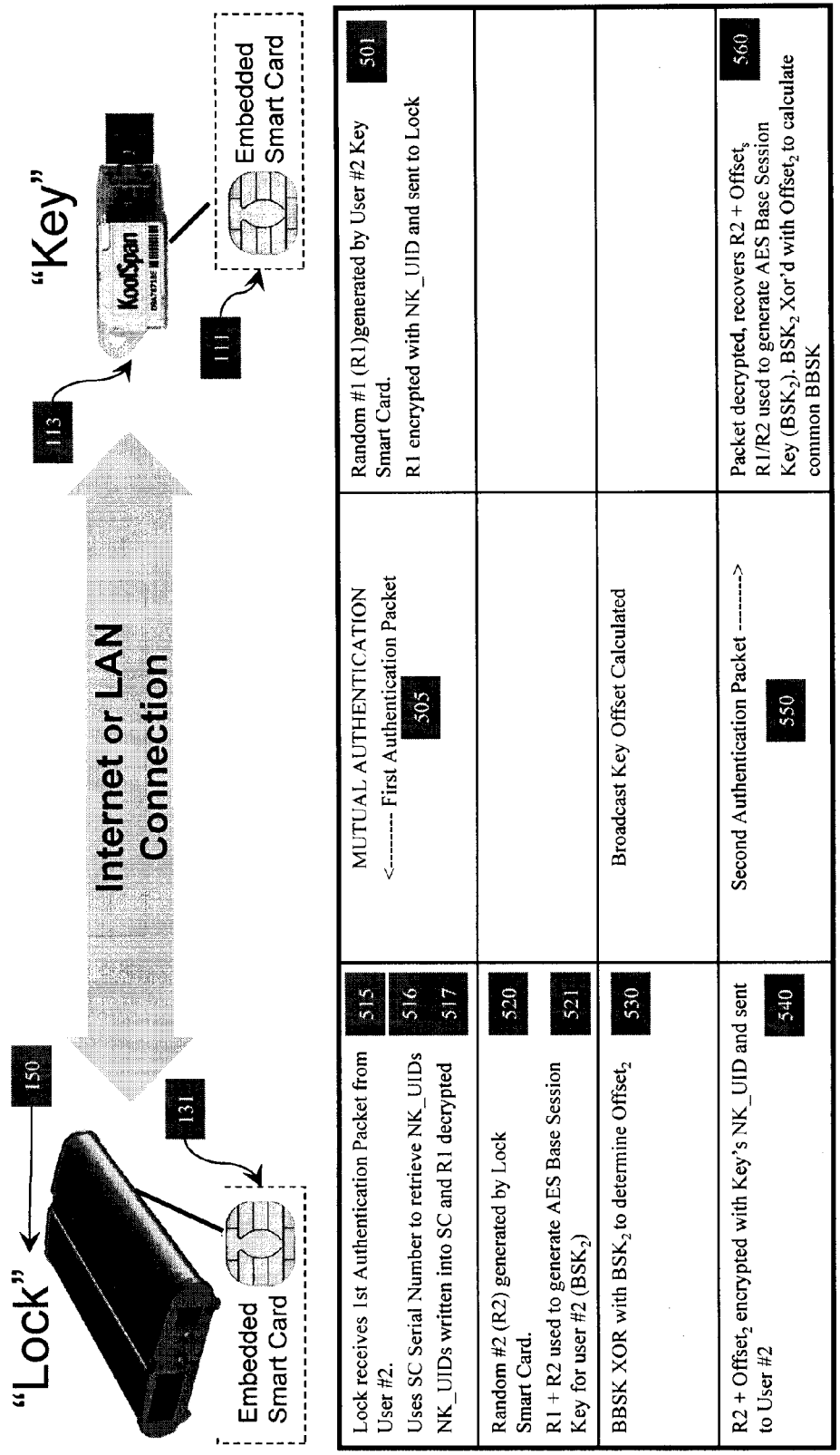
Fig 5: Authentication Sequence: second user

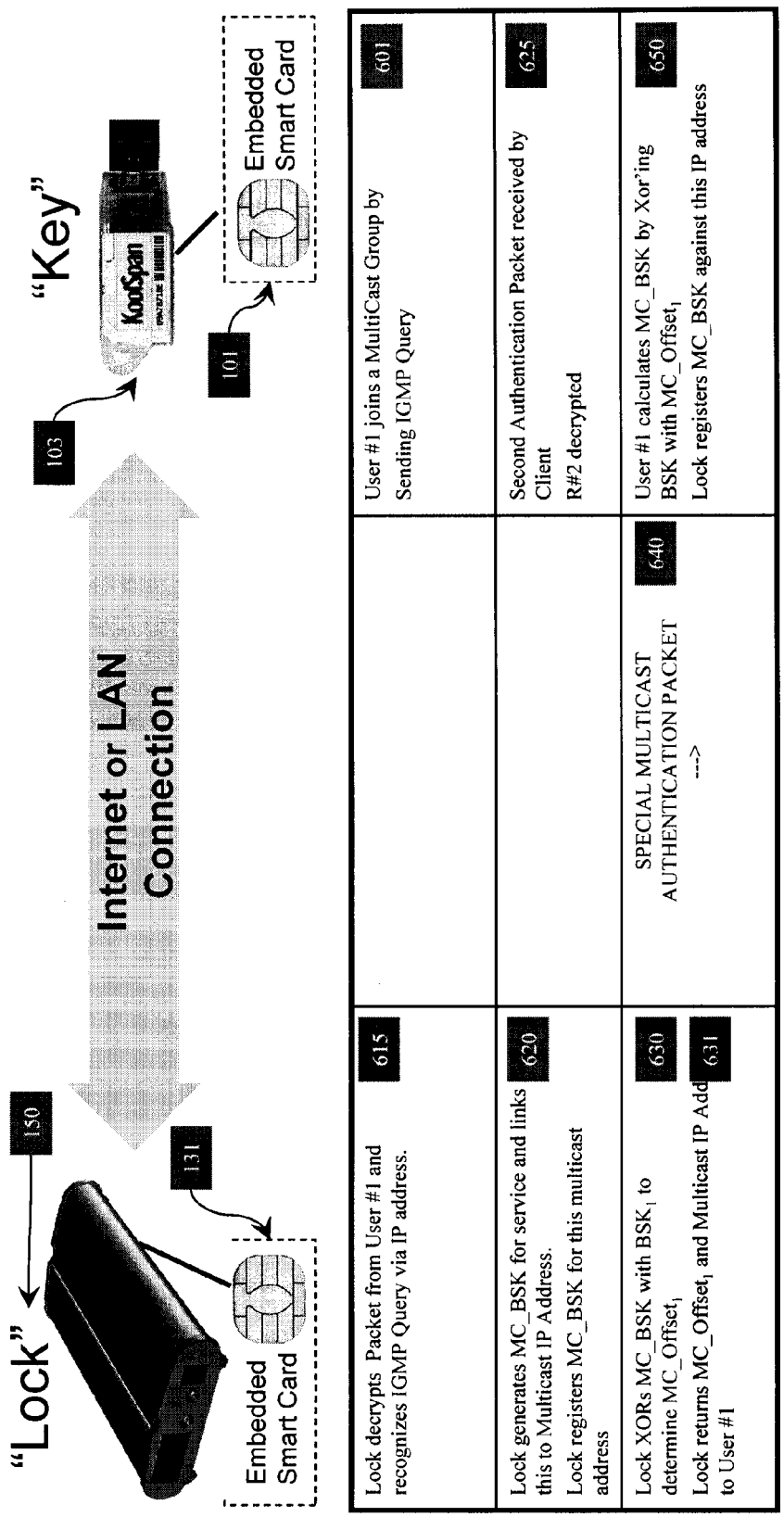

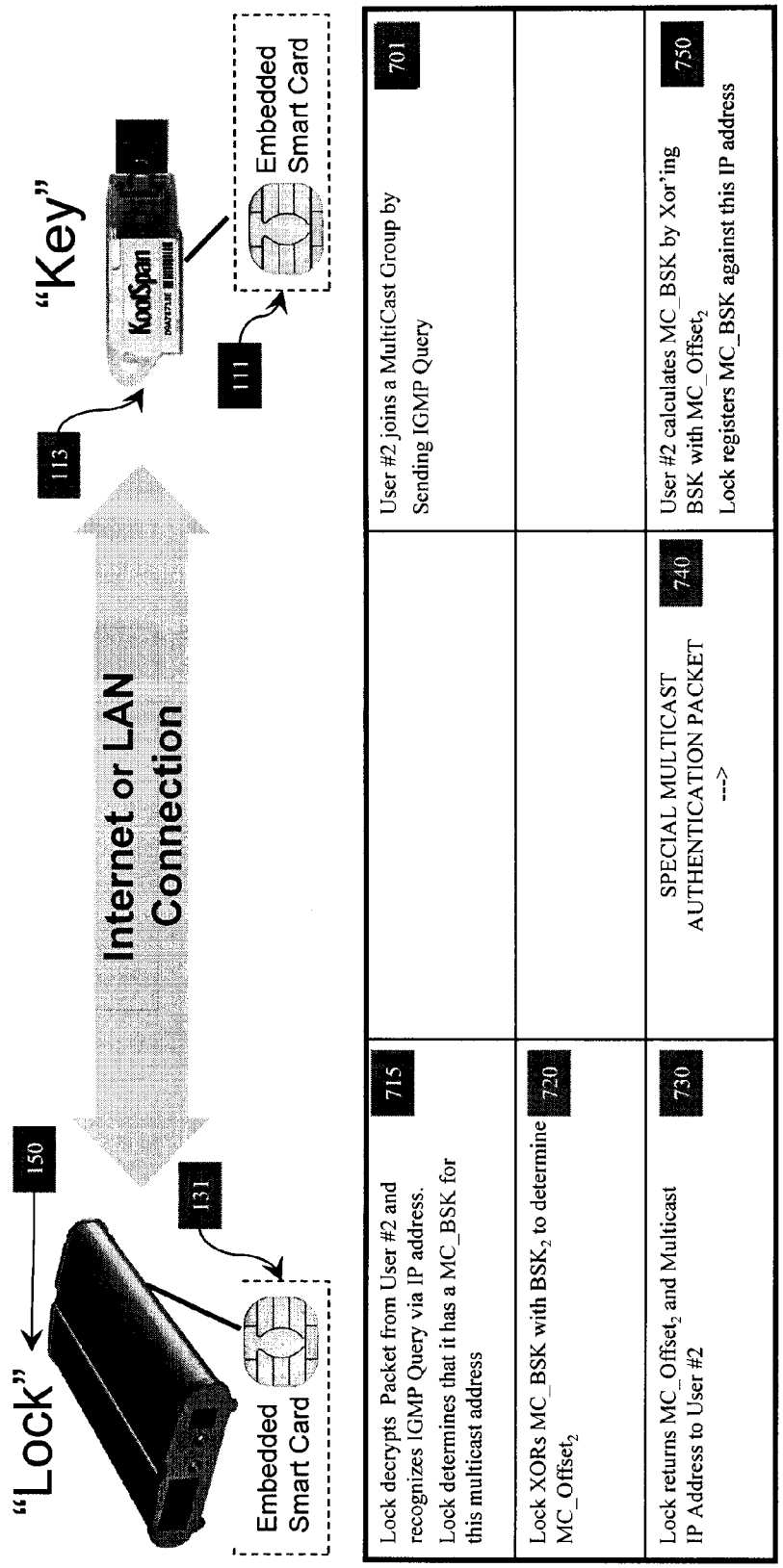

SYSTEM AND METHOD OF CREATING AND SENDING BROADCAST AND MULTICAST DATA

This application is a continuation of U.S. patent application Ser. No. 13/047,384, filed Mar. 14, 2011, now U.S. Pat. No. 8,345,875, which is a continuation of U.S. patent application Ser. No. 11/763,854, now U.S. Pat. No. 7,907,735, filed Jun. 15, 2007, the entire contents of both of which are incorporated herein by reference in their entirety.

CROSS-REFERENCE TO RELATED APPLICATIONS

The present application is related to U.S. patent application Ser. No. 10/679,371, entitled "Localized Network Authentication and Security Using Tamper-Resistant Keys," filed on Oct. 7, 2003, to U.S. patent application Ser. No. 11/001,084, entitled "Remote, Secure Authorization," filed on Dec. 2, 2004, to U.S. patent application Ser. No. 10/935,123, entitled "Subnet Box," filed on Sep. 8, 2004, to U.S. patent application Ser. No. 11/763,843, entitled "System and Method of Per-Packet Keying," filed on Jun. 15, 2007, and to U.S. patent application Ser. No. 13/047,384, entitled "System and Method of Creating and Sending Broadcast and Multicast Data," filed on Mar. 14, 2011, all of whose contents are incorporated by reference herein in their entireties.

FIELD OF THE INVENTION

The present invention generally relates to encrypting broadcast or multicast data between two or more parties, such as over a virtual private network or a secure wireless connection. More particularly, the present invention relates to a method of encrypting and decrypting data.

BACKGROUND OF THE INVENTION

Encryption techniques typically provide for a "session key" for encrypting data sent across a communication link. Data sent across a communication link is typically either unicast communication, broadcast communication, or multicast communication. A unicast communication is data sent from a sending host to a receiving host. Broadcast communication is data sent from a sending host to all other hosts on a specified network. Multicast communication is data sent from a sending host to a defined group of receiving hosts.

A unique session key generated on one side of a remote communication link could be used to encrypt broadcast data and send it across the communication link, but because broadcast data is sent to more than one party, the session key would have to be defined and distributed to all parties who would receive the broadcast data. A static approach wherein the session key is well defined and distributed across the communication link would be susceptible to attack and therefore might not be secure.

Additionally, multicast sessions are similar to broadcast sessions in that data is distributed to more than one host. Multicast sessions therefore suffer from the same problem as described above, where a static key distributed to all multicast receivers would be susceptible to attack. Also, multicast sessions tend to be ad-hoc, and distributing static keys for multiple multicast sessions would require considerable planning and management.

SUMMARY OF CERTAIN EMBODIMENTS OF THE INVENTION

According to a first embodiment of the invention, a method of creating a shared broadcast session key and encrypting broadcast data communicated between two or more parties is presented. The method includes generating, by the first party, a first random number, encrypting, by the first party, the first random number to form a first ciphertext and communicating, by the first party, the first ciphertext to a second party. The method further includes decrypting, by the second party, the first ciphertext to yield the first random number, generating, by the second party, a second random number, forming, by the second party, a base session key as a function of the first random number and the second random number, and forming, by the second party, a broadcast session key. The method further includes determining, by the second party, an offset as a function of the base session key and the broadcast session key, encrypting, by the second party, the second random number and the offset to form a second ciphertext and communicating, by the second party, the second ciphertext. The method further includes decrypting, by the first party, the second ciphertext to yield the second random number and the offset, forming, by the first party, the base session key as a function of the first random number and the second random number, and forming, by the first party, the broadcast session key as a function of the base session key and the offset.

Various optional features of the first embodiment include the following. The first random number may be encrypted using a pre-provisioned key. The pre-provisioned key may be located on a smart card device, where the smart card device also contains a unique identification key. The unique identification key may be communicated with the encrypted first random number. The first ciphertext may be decrypted using a pre-provisioned key. The second party may query a database to receive the pre-provisioned key. The base session key may be formed by concatenating the first random number and the second random number, hashing the concatenated number eight times in succession, with the results concatenated, and performing an XOR function on each group of five bits of the result. The broadcast session key may be formed by the second party by generating a third random number and a fourth random number, concatenating the third random number and the fourth random number, hashing the concatenated number eight times in succession, with the results concatenated, and performing an XOR function on each group of five bits of the result. The second party may determine the offset by performing an XOR function on the base session key and the broadcast session key. The broadcast session key may be formed by the first party by performing an XOR function on the base session key and the offset. The second party may form a new broadcast session key and communicate the new broadcast session key to the first party. The second party may communicate the broadcast key to one or more additional parties.

According to a second embodiment of the invention, a method of providing two or parties with a shared broadcast session key for encrypting broadcast data transferred between the two or more parties is presented. The method includes generating a first random number, encrypting the first random number to form a first ciphertext, communicating the first ciphertext to a second party, decrypting the first ciphertext to yield the first random number, generating a second random number, and forming a base session key as a function of the first random number and the second random number. The method further includes generating a third random number, generating a fourth random number, and forming a broadcast session key as a function of the third random number and the fourth random number. The method further includes determining an offset as a function of the base session key XOR the broadcast session key, encrypting the second random number and the offset to form a second ciphertext, and communicating the second ciphertext. The method further includes decrypting the second ciphertext to yield the second random number and the offset, forming the base session key as a function of the first random number and the second random number, and forming the broadcast session key as a function of the base session key and the offset.

According to a third embodiment of the invention, a method of creating a shared multicast session key and encrypting multicast data transferred between two or more parties, each party having knowledge of a shared base session key, is presented. The method includes creating, by the first party, an IGMP query, encrypting, by the first party, the IGMP query to create a first ciphertext, communicating, by the first party, the first ciphertext across a communication link, decrypting, by the second party, the first ciphertext to yield the IGMP query, and generating, by the second party, a multicast session key. The method further includes forming, by the second party, an offset as a function of the shared base session key and the multicast session key, encrypting, by the second party, the offset to create a second ciphertext, and communicating, by the second party, the second ciphertext across the communication link. The method further includes decrypting, by the first party, the second ciphertext to yield the offset, and forming, by the first party, the multicast session key as a function of the shared base session key and the offset. Each multicast packet may be encrypted by either the first party or the second party using the multicast session key, and decrypted by another authenticated party having the same multicast session key.

Various optional features of the third embodiment include the following. The second party may form the offset by performing an XOR function on the multicast session key and the shared base session key. The first party may form the multicast session key by performing an XOR function on the shared base session key and the offset.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 1 is a schematic diagram of a network connection between two remote users and an office Local Area Network according to an embodiment of the present invention;

FIG. 2 is a schematic diagram of an end-user system with smart card authentication and security according to an embodiment of the present invention;

FIG. 3 is a schematic diagram of a smart card equipped lock device according to an embodiment of the present invention;

FIG. 4 is a schematic diagram of an authentication sequence between a smart card equipped lock device and a smart card equipped first user for broadcast data according to an embodiment of the present invention;

FIG. 5 is a schematic diagram of an authentication sequence between a smart card equipped lock device and a smart card equipped second and/or subsequent user for broadcast data according to an embodiment of the present invention;

FIG. 6 is a schematic diagram of a secure multicast session between a smart card equipped lock device and a smart card equipped first user according to an embodiment of the present invention; and FIG. 7 is a schematic diagram of a secure multicast session between a smart card equipped lock device and a smart card equipped second and/or subsequent user according to an embodiment of the present invention.

DETAILED DESCRIPTION OF EMBODIMENTS

A description of certain embodiments of the present invention may be understood by referring to FIGS. 1 through 7, wherein like reference numerals refer to like elements, and are generally described in the context of a remote access network.

Certain embodiments of the present invention provide for secure broadcast and multicast keys to be determined "on-the-fly" for each user or session in an efficient manner that conserves valuable network resources. The broadcast and multicast keys, according to certain embodiments, are never transmitted across the communication link but are calculated as a result of a process that occurs on both sides of the link independently from an exchange of information. In certain embodiments, the generated broadcast or multicast keys are not utilized directly in encryption or decryption processes, with the system instead relying on "per-packet keying," whereby an offset value that changes with each packet is logically added to the session key for broadcast or multicast transmissions such that a new per-packet key, offset from the session key, is used to encrypt or decrypt the data. A smart card enabled random number generator may be used to provide such an offset so that the per-packet key is not only different for each packet but different for each multicast session.

In an embodiment of the present invention, a session key is employed, but not utilized, for encrypting a plaintext payload. Instead, the session key is designated as a base session key ("BSK") and is shared by both sides of the communication link. The BSK is used to create a new per-packet key for each data packet transmitted. In such an embodiment, an offset value that changes with each packet is logically added to the BSK such that a new per-packet key, offset from the session key, is used to encrypt and decrypt plaintext data. Embodiments of the present invention may provide such an offset from a smart-card-enabled random number generator independently on each side of the communications link such that the per-packet key is not only different for each packet but also different in each direction of communication. The BSK is not exchanged, but instead calculated as a result of a mutual authentication process occurring on both sides of the communications link. This entirely prevents dictionary attacks, as the encryption keys for each packet and in each direction are different and never utilized in succession. The mutual authentication process referred to above, by the way of non-limiting example, may be enabled using a smart card.

Certain embodiments of the present invention are able to provide keys for multicast and broadcast encryption and decryption purposes. For example, certain embodiments of the present invention enable the ability for two parties to be in possession of a same key, such that communications between the parties may be encrypted and decrypted using the key or derivations thereof. Certain embodiments of the present invention may be used to establish that one or more first parties (e.g., broadcasters) and at least one or more second parties (e.g., receivers) have a same key or derivations thereof, such that communications sent from the one or more first parties may be encrypted, and the various second parties may decrypt the communications. This is an example of broadcast encrypted communication. Yet other embodiments of the present invention enables the ability of a select group of at least one first party and a select group of at least one or more second parties to be in possession of a same key, such that communications sent from the one or more selected first parties may be encrypted with the key or derivation thereof and such that the select group of at least one or more second parties may decrypt the communications. This is an example of multicast encrypted communication. Such authorized receivers may be authorized by way of a priori knowledge of a distribution list or dynamically determined via mechanisms such as the Internet Group Management Protocol ("IGMP").

Certain embodiments of the present invention may simultaneously provide multicast and broadcast encrypted communications. For example, certain embodiments of the present invention may allow a first party to establish a first key with a first group for the purpose of broadcast communications, while also establishing a second key with a second group for multicast communications. In such embodiments, the first and second group may be identical, may partially overlap, or may be disjoint. More generally, embodiments of the present invention can establish multiple broadcast keys and multiple multicast keys for virtually any combination of senders and groups. Thus, a single sender can act as one or more multicasters for any combination of groups and one or more broadcasters.

Certain embodiments of the present invention have advantages over prior art broadcast and multicast techniques. For example, some prior art techniques for multicasting require that each party in the multicast distribution group have a different key. This is problematic because the multicaster must separately encrypt each packet or communication for each receiving party. Such separate encryption is highly resource intensive. Certain embodiments of the present invention avoid this problem by determining a mutual key among at least one sender and its broadcast or multicast audience.

Certain embodiments of the present invention have further advantages over prior art unicast, broadcast and multicast techniques. For example, at least one or more first or second parties can join into an secure conversation any time during the duration of the communications. Also, the communications can be dynamically or statically changed between unicast, multicast, and broadcast methodologies. By way of non-limiting example, a first and second party may enter into a conversation. Sometime after the communications has been established, both parties agree that another second party should join (as in a conference call). After establishment of communications with the joined party, secure communications can now flow between all three members using the mutual key or derivation thereof. This an example of the communications changing between unicast and multicast methodologies.

Although certain embodiments of the present invention include computing devices such as personal computers and network-based lock devices, the invention is not so limited. By way of non-limiting example, devices communicating in accordance with certain embodiments of the present invention include headless devices where there may be no user or user input device present, e.g., sensor devices, Supervisory Control and Data Acquisition ("SCADA") devices, video or audio surveillance systems, home control or alarm systems, lighting systems, etc.

Although certain embodiments of the present invention include tokens such as smart cards, the invention is not so limited. By way of non-limiting example, tokens and techniques for their connection according to certain embodiments of the invention include network-based smartcards that are connected to devices over a network connection, subscriber identity modules, Secure Digital devices, FPGA devices, ASIC devices, etc. Other devices communicating in accordance with certain embodiments of the present invention include mobile communications devices such as, by way of non-limiting example, personal digital assistants and mobile phones.

Although certain embodiments of the present invention are described in the context of a remote access network, embodiments of the present invention are applicable to any communication networks where two or more parties communicate using encrypted communications. By way of non-limiting example, the present invention may enable secure end-to-end access between a remote client and any computer residing on a network backbone.

Although certain embodiments of the present invention include communications channels such as computer networks, the invention is not so limited. For example, communications channels according to certain embodiments of the invention include computer memory devices (e.g., hard drive, flash devices, floppy disks, optical devices such as optical disks, shared memory, etc.). These memory devices may be transferred from one device to another or may be used to pass data from one environment to another, where the environments may or may not reside on the same physical machine.

Furthermore, the invention is not limited to communications. Rather, certain embodiments of the present invention encrypt stored data that is later retrieved according to features described herein.

FIG. 1 illustrates a network connection between a remote user and office local area network according to an embodiment of the present invention. In this embodiment, a session key is employed, but is not itself transmitted across the communication link. In particular, this embodiment implements a technique of per-packet keying. The embodiment of FIG. 1 employs a combination of software routines and physical tokens in the form of easy-to-use client adapters (103) containing smart cards (101) that attach to existing computing devices (105) and network-based lock devices (150) containing embedded smart cards (131). A lock (150) is a device that authenticates users and bridges their ethernet traffic onto a network. These smart cards are secure, tamper-resistant, and pre-provisioned with secure authentication keys.

In reference to the embodiment of FIG. 1, no encryption keys are stored in the smart cards; instead the encryption keys are calculated as a result of authentication at the edge of the network. "Edge" refers to authentication of client devices taking place at the edge or outer boundary of the network, e.g., at the lock (150), rather than centralized within the network using a server. Client computing devices (105) are authenticated across wired or wireless links (125) using secret cryptographic authentication keys, which are pre-stored in the smart cards (101, 131) respectively installed at the client's computing device and the network-based lock device (150). According to the embodiment of FIG. 1, a lock device (150) is installed in the network providing a terminus of the communication between the local area network (135) and the remote user (105). In other embodiments, the lock may be a standalone device such as a KoolSpan SecureEdge Lock, or an appliance containing lock functionality such as a Dell PowerEdge Server running KoolSpan software. In yet other embodiments, the lock may be of the form of a client, which would allow for peer-to-peer secure communication.

FIG. 2 is a schematic diagram of an end-user system with smart card authentication and security according to an embodiment of the present invention. In particular, FIG. 2 shows an end-user configuration consisting of a personal computer ("PC") (105) and smart card (101) inserted into a universal serial bus smart card reader or client token (103).

The actual interface between the smart card and PC can be implemented in numerous ways known to those of ordinary skill in the art. For example, U.S. patent application Ser. No. 10/679,371, entitled "Localized Network Authentication and Security Using Tamper-Resistant Keys," discusses exemplary techniques. Varied implementations may include serial readers, parallel readers, Personal Computer Memory Card International Association ("PCMCIA") readers, etc. The client token may even be embedded directly into the PC itself. The end-user configuration also contains client driver (210/220) software installed on PC (105). Client driver (220) is designed such that it will recognize the insertion and removal of client token (105) containing smart card (101). When inserted into PC (105), client driver (220) will present a Personal Identification Number ("PIN") entry dialog to the user via the operating system (230). One purpose of the PIN-entry dialog is to "unlock" the token by the legitimate user. Incorrect entry of the PIN after a preset number of attempts will cause smart card (101) to "lock up" and be of no further use. Once the PIN process is completed, the authentication sequence to remote lock device (150) is initiated. The ethernet interface (200) provides a connection between the network hardware and the client driver.

FIG. 3 is a schematic diagram of a smart card equipped lock device according to an embodiment of the present invention. In particular, FIG. 3 shows network-based lock device (150) attached to local area network (135), which also contains an embedded smart card (131). The operating system of the lock (320), the driver (330), and the network driver (310) process received ethernet frames from the ethernet interface (300). The lock device (150) can be implemented in numerous ways known to those of ordinary skill in the art. For example, U.S. patent application Ser. No. 10/935,123, entitled "Subnet Box," discusses exemplary techniques.

Broadcast Key Transmission

FIG. 4 is a schematic diagram of an authentication sequence between a smart card equipped lock device and a smart card equipped first user for broadcast data according to an embodiment of the present invention. In particular, FIG. 4 shows a successful authentication sequence involving the exchange of encrypted random numbers generated by the smart cards on each side of the link (the lock smart card (131) and the client smart card (101) of the first user) and sent to the other side for decryption. In the present embodiment, the exchange of encrypted random numbers is achieved by allowing the lock to retrieve the client's secret encryption key and use it for encrypting and decrypting data sent back and forth.

An exemplary authentication process begins when a first random number (step 401) is generated by the client smart card (101) and is encrypted by the secret key pre-stored in the client smart card yielding ciphertext. The secret encryption key, the NK_UIDs, is the client's secret key that is only assigned to authorized client tokens, and is mapped to a unique serial number that identifies the client token. Once the ciphertext is generated, it is sent to the lock along with the serial number of the client smart card (101) in a first authentication packet (step 405). During authentication, the client driver (220) sends the first encrypted random number along with the plaintext serial number of the user's smart card (101). The lock is provisioned with a database of serial numbers of authorized users and their corresponding NK_UIDs keys. The database may be located on hardware contained in the lock or may optionally be accessible across a communication link.

When the lock receives the first authentication packet (step 415), it uses the serial number of the client smart card (101) contained in the first authentication packet to retrieve the enciphered version of the client smart cards' NK_UIDs in the lock database. The lock database contains a mapping of client smart card serial numbers to corresponding NK_UIDs keys. During authentication, the first user's serial number is utilized to retrieve the enciphered version of the first user's NK_UIDs key from its database and is then written in enciphered form into the lock's smart card (131) where it is automatically deciphered by the lock's smart card (131). At that instant in time the lock's smart card (131) and the client's smart card (101) contain exactly the same NK_UIDs key. Then the lock's smart card (131) decrypts the first encrypted random number (step 417). Appropriate checks and balances are incorporated to ensure that a successful decryption can be detected.

In Step 418, a second random number is generated by the lock's smart card (131) (step 418). The first random number and the second random number are concatenated together to yield a 512-bit concatenated string. The 512-bit concatenated string is then hashed eight times in succession with the digests of each of the eight hash operations themselves concatenated. The resulting 1280-bit digest is then "collapsed" by using the Exclusive-Or function, also known as XOR, on each group of five bits. This results in a 256-bit base session key for the first user ($BSK_1$) (step 419). The lock's smart card (131) then generates a third random number and a fourth random number. The third random number and the fourth random number are concatenated together to yield a 512-bit concatenated string. The 512-bit concatenated string is then hashed eight times in succession with the digests of each of the eight hash operations themselves concatenated. The resulting 1280-bit digest is then "collapsed" by using the Exclusive-Or function on each group of five bits. This results in a 256-bit Broadcast Session Key (BBSK). The lock's smart card (131) then uses an Exclusive-Or function on $BSK_1$ and BBSK to yield $Offset_1$ (step 430). The second random number is concatenated with $Offset_1$ and this string is encrypted by the lock's smart card (131) using the first users' NK_UIDs (step 440) to yield ciphertext. The resulting ciphertext is sent to the first user across the communication link (step 450). The first user's smart card (101) decrypts the ciphertext, yielding $Offset_1$ and the second random number.

The first user uses the first random number, which was generated by the first user's smart card (101), and the second random number, which was generated by the lock's smart card (131) and transmitted to the first user, and concatenates the two numbers. The 512-bit concatenated string is then hashed eight times in succession with the digests of each of the eight hash operations themselves concatenated. The resulting 1280-bit digest is then "collapsed" by using the Exclusive-Or function on each group of five bits. This results in the same 256-bit $BSK_1$ as was calculated by the lock's smart card (131). The first user than performs an Exclusive-Or function on $BSK_1$ and $Offset_1$ to calculate the BBSK. This results in the same 256-bit BBSK as was calculated by the lock's smart card (131) (step 460). The $BSK_1$ and BBSK can then be used to encrypt and decrypt subsequent communications between the parties. Thus, certain embodiments of the invention provide mutual keys to different parties, who use them to encrypt and decrypt communications between the parties.

FIG. 5 is a schematic diagram of an authentication sequence between a smart card equipped lock device and a smart card equipped second and/or subsequent user for broadcast data according to an embodiment of the present invention. According to the embodiment of FIG. 5, a second user or a subsequent user may obtain the BBSK in a similar manner as that described above in relation to FIG. 4. The lock shares the BBSK calculated during the first user's authentication sequence and transmits the formula values that the second user and subsequent users can operate on to yield the BBSK, as discussed in detail below.

An exemplary second or subsequent user authentication process begins when a first random number (step 501) is generated by the client smart card (111) and is encrypted by the secret key pre-stored in the client smart card yielding ciphertext. The secret encryption key, the NK_UIDs, is the client's secret key that is only assigned to authorized client tokens, and is mapped to a unique serial number that identifies the client token. Once the ciphertext is generated, it is sent to the lock along with the serial number of the client smart card (111) in a first authentication packet (step 505). During authentication, the client driver (220) sends the first encrypted random number along with the plaintext serial number of the user's smart card (111). The lock is provisioned with a database of serial numbers of authorized users and their corresponding NK_UIDs keys. The database may be located on hardware contained in the lock or may optionally be accessible across a communication link.

When the lock receives the first authentication packet (step 515) it uses the serial number of the client smart card (111) contained in the first authentication packet to retrieve the enciphered version of the client smart cards' NK_UIDs in the lock database. The lock database contains a mapping of client smart card serial numbers to corresponding NK_UIDs keys. During authentication, the user's serial number is utilized to retrieve the enciphered version of the user's NK_UIDs key from its database and is then written in enciphered form into the lock's smart card (131) where it is automatically deciphered by the lock's smart card (131). At that instant in time the lock's smart card (131) and the client's smart card (111) contains exactly the same NK_UIDs key. Then the lock's smart card (131) decrypts the first encrypted random number (step 517). Appropriate checks and balances are incorporated to ensure that a successful decryption can be detected.

In Step 520, a second random number is generated by the lock's smart card (131). The first random number and the second random number are concatenated together to yield a 512-bit concatenated string. The 512-bit concatenated string is then hashed eight times in succession with the digests of each of the eight hash operations themselves concatenated. The resulting 1280-bit digest is then "collapsed" by using the Exclusive-Or function on each group of five bits. This results in a 256-bit base session key for the second user ($BSK_2$) (step 521). The lock's smart card (131) then uses an Exclusive-Or function on $BSK_2$ and BBSK (previously generated when the first user authenticated) to yield $Offset_2$ (step 530). The second random number is concatenated with $Offset_2$ and this string is encrypted by the lock's smart card (131) with the second users' NK_UIDs (step 540) to yield ciphertext. The resulting ciphertext is sent to the second user (step 550). The second user decrypts the ciphertext, yielding $Offset_2$ and the second random number.

The second user uses the first random number, which was generated by the second user's smart card (111), and the second random number, which was generated by the lock's smart card (131) and transmitted to the second user, and concatenates the two numbers. The 512-bit concatenated string is then hashed eight times in succession with the digests of each of the eight hash operations themselves concatenated. The resulting 1280-bit digest is then "collapsed" by using the Exclusive-Or function on each group of five bits. This results in the same 256-bit $BSK_2$ as was calculated by the lock's smart card (131). The second user than performs an Exclusive-Or function on $BSK_2$ and $Offset_2$ to calculate BBSK (step 560). This results in the same 256-bit BBSK as was calculated by the lock's smart card (131) and the first user's smart card (101).

As shown above, the BBSK is never transmitted, either in plaintext or in encrypted form, across the communication link. The lock and the first user share the same $BSK_1$ value, and the lock and the second user share the same $BSK_2$ value. The lock, the first user, and each subsequent user forms the BBSK from values transmitted in encrypted form across the communication link, and each user and the lock create exactly the same BBSK. The BBSK may be used to encrypt subsequent communications between the parties. Thus, this embodiment provides mutual keys to different parties, who use them to encrypt and decrypt communications between the parties.

Multicast Key Transmission

FIG. 6 is a schematic diagram of a secure multicast session between a smart card equipped lock device and a smart card equipped first user according to an embodiment of the present invention. In particular, FIG. 6 illustrates an authentication sequence between the lock (150) and the first user and first user's key (103). Multicast key transmission according to the present invention is similar to broadcast key transmission. The multicast key transmission protocol assumes that the first user to join the multicast group has already authenticated with the lock as shown above, and that both the lock and the first user have an identical copy of $BSK_1$. The first user utilizes the client driver (220) to encrypt an IGMP query, and sends the encrypted ciphertext across a communication link to the lock (150) (step 601). The lock (150) decrypts the ciphertext to yield the IGMP query and notes the IP address of the first user, which was also sent with the ciphertext across the communication link (step 615). The lock (150) forwards the IGMP query to the appropriate client or server within the secured network according to procedures well known in the art. The lock's smart card (131) then generates a first random number and a second random number. The first random number and the second random number are concatenated together to yield a 512-bit concatenated string. The 512-bit concatenated string is then hashed eight times in succession with the digests of each of the eight hash operations themselves concatenated. The resulting 1280-bit digest is then "collapsed" by using the Exclusive-Or function on each group of five bits. This results in a 256-bit Multicast Session Key (MC_BSK). The lock then links the MC_BSK to the first user's IP address and registers the MC_BSK for this multicast session (step 620). The lock's smart card (131) then uses an Exclusive-Or function on $BSK_1$ and MC_BSK to yield $MC\_Offset_1$ (step 630). The lock (150) then encrypts $MC\_Offset_1$ and the multicast IP address using $BSK_1$, and transmits the resulting ciphertext across the communication link to the first user (steps 631 and 640) in a special multicast authentication packet. The first user decrypts the ciphertext using $BSK_1$, yielding $MC\_Offset_1$ and the multicast IP address. The first user calculates MC_BSK by using an Exclusive-Or function on $BSK_1$ and $MC\_Offset_1$ (step 650). The first user then registers the MC_BSK with the first user's IP address. The $BSK_1$, MC_BSK, and its offsets can then be used to encrypt and decrypt subsequent communications between the parties. Thus, this embodiment provides mutual keys to different parties, who use them to encrypt and decrypt communications between the parties.

FIG. 7 is a schematic diagram of a secure multicast session between a smart card equipped lock device and a smart card equipped second and/or subsequent user according to an embodiment of the present invention. In particular, FIG. 7 illustrates an authentication sequence between the lock (150) and a second user and any subsequent user and their key (113). The multicast key transmission protocol assumes that a second user and every subsequent user to join the multicast group has already authenticated with the lock as shown above, that both the lock and the first user have an identical copy of $BSK_2$, and that a $MC\_BSK$ for the multicast group has already been generated by the authentication procedure of the first user to the multicast group. The second user utilizes the client driver (220) to encrypt an IGMP query, and sends the encrypted ciphertext across a communication link to the lock (150) (step 701). The lock (150) decrypts the ciphertext to yield the IGMP query and notes the IP address of the second user, which was also sent with the ciphertext across the communication link (step 715). The lock (150) forwards the IGMP query to the appropriate client or server within the secured network according to procedures well known in the art. The lock then links the $MC\_BSK$, which was generated during the authentication procedure for the first user, to the second user's IP address (step 720). The lock's smart card (131) then uses an Exclusive-Or function on $BSK_2$ and $MC\_BSK$ to yield $MC\_Offset_2$ (step 730). The lock (150) then encrypts $MC\_Offset_2$ and the multicast IP address using $BSK_2$, and transmits the resulting ciphertext across the communication link to the second user (steps 730 and 740) in a special multicast authentication packet. The second user decrypts the ciphertext using $BSK_2$, yielding the $MC\_Offset_2$ and the multicast IP address. The second user calculates $MC\_BSK$ by using an Exclusive-Or function on $BSK_2$ and $MC\_Offset_2$ (step 750). The second user then registers the $MC\_BSK$ with the second user's IP address. The $BSK_2$, $MC\_BSK$, and its offsets can then be used to encrypt and decrypt subsequent communications between the parties. Thus, this embodiment provides mutual keys to different parties, who use them to encrypt and decrypt communications between the parties.

Encryption and decryption as disclosed herein may be accomplished by any of a variety of algorithms, such as, by way of non-limiting example, AES, DES, 3DES, AES, and International Data Encryption Algorithm (IDEA).

As used herein, the term "packet" embraces a single datum or group of data enveloped for transfer over a communications network. An entire file or collection of files enveloped together in may also be considered a packet. In general, the invention includes the ability to provide keys used for the ciphering or authentication that are generated or derived per datum, packet, or session.

We claim:

1. A device comprising:
   at least one memory configured to store instructions and data; and
   at least one processor configured to access the at least one memory and execute the instructions, causing the at least one processor to:
   generate an Internet Group Management Protocol (IGMP) query;
   encrypt the IGMP query to create a first cyphertext;
   transmit, to a lock device having access to a shared base session key, the first cyphertext, wherein the lock device is configured to decrypt the first cyphertext to yield the IGMP query and generate a multicast offset value;
   receive, from the lock device, encrypted data including the multicast offset value; and;
   calculate a multicast base session key as a function of the shared base session key and the multicast offset value.

2. The device of claim 1, wherein the at least one processor is configured to access the at least one memory and execute the instructions, causing the at least one processor to:
   encrypt data based on one or more of the shared base session key, the multicast base session key, and the multicast offset value; and
   transmit the encrypted data to one or more other devices.

3. The device of claim 1, wherein the at least one processor is configured to access the at least one memory and execute the instructions, causing the at least one processor to:
   encrypt data based on the shared base session key, the multicast base session key, and the multicast offset value; and
   transmit the encrypted data to one or more other devices.

4. The device of claim 1, wherein the at least one processor is configured to access the at least one memory and execute the instructions, causing the at least one processor to:
   receive, from the one or more other devices, encrypted multicast data; and
   decrypt the received encrypted multicast data based on one or more of the shared base session key, the multicast base session key, and the multicast offset value.

5. The device of claim 1, wherein the at least one processor is configured to access the at least one memory and execute the instructions, causing the at least one processor to:
   decrypt the received encrypted data to obtain the multicast offset value.

6. A computer-implemented method, comprising:
   generating, by a first device having at least one processor and at least one memory, an Internet Group Management Protocol (IGMP) query;
   encrypting, by the first device, the IGMP query to create a first cyphertext;
   transmitting, to a lock device having access to a shared base session key, the first cyphertext, wherein the lock device is configured to decrypt the first ciphertext to yield the IGMP query and generate a multicast offset value;
   receiving, from the lock device, encrypted data including the multicast offset value; and
   calculating, using the at least one processor, a multicast base session key as a function of the shared base session key and the multicast offset value.

7. The computer-implemented method of claim 6, further including:
   encrypting, using the at least one processor, data based on one or more of the shared base session key, the multicast base session key, and the multicast offset value; and
   transmitting the encrypted data to one or more other devices.

8. The computer-implemented method of claim 6, further including:
   encrypting, using the at least one processor, data based on the shared base session key, the multicast base session key, and the multicast offset value; and
   transmitting the encrypted data to one or more other devices.

9. The computer-implemented method of claim 6, further including:
   receiving, from the one or more other devices, encrypted multicast data; and
   decrypting, using the at least one processor, the received encrypted multicast data based on one or more of the shared base session key, the multicast base session key, and the multicast offset value.

10. The computer-implemented method of claim 6, further including:
    decrypting, using the at least one processor, the received encrypted data to obtain the multicast offset value.

11. A computer-implemented method, comprising:
generating, by a first device having at least one processor and at least one memory, a multicast group identification query, wherein the multicast group identification query is a protocol-based query that identifies the members of a multicast distribution list;
encrypting, by the first device, the multicast group identification query to create a first cyphertext;
transmitting the first cyphertext to a lock device having access to a shared base session key, wherein the lock device is configured to decrypt the first ciphertext to yield the multicast group identification query and generate a multicast offset value;
receiving, from the lock device, encrypted data including the multicast offset value; and
calculating, using the at least one processor, a multicast base session key as a function of the shared base session key and the multicast offset value.

12. The computer-implemented method of claim 11, further including:
encrypting, using the at least one processor, data based on one or more of the shared base session key, the multicast base session key, and the multicast offset value; and
transmitting the encrypted data to one or more other devices.

13. The computer-implemented method of claim 11, further including:
encrypting, using the at least one processor, data based on the shared base session key, the multicast base session key, and the multicast offset value; and
transmitting the encrypted data to one or more other devices.

14. The computer-implemented method of claim 11, further including:
receiving, from the one or more other devices, encrypted multicast data; and
decrypting, using the at least one processor, the received encrypted multicast data based on one or more of the shared base session key, the multicast base session key, and the multicast offset value.

* * * * *